United States Patent [19]

Brenden et al.

[11] 3,832,677

[45] Aug. 27, 1974

[54] SCANNING MID FREQUENCY ACOUSTICAL PROSPECTING METHOD

[75] Inventors: Byron B. Brenden, Richland; Victor I. Neeley; George F. Garlick, both of Kennewick, all of Wash.

[73] Assignee: Holosonics, Richland, Wash.

[22] Filed: Aug. 2, 1973

[21] Appl. No.: 384,913

Related U.S. Application Data

[63] Continuation of Ser. No. 31,306, April 23, 1970, abandoned.

[52] U.S. Cl...... 340/15.5 TN, 340/15.5 SW, 175/50
[51] Int. Cl. .......................... G01v 1/28, G01v 1/40
[58] Field of Search............ 340 15.5 AC, 15.5 SW, 15.5 BH; 181/.5 AG, .5 BE; 175/50

[56] References Cited
UNITED STATES PATENTS

| | | | |
|---|---|---|---|
| 2,813,590 | 11/1957 | McDonald | 181/.5 AG |
| 3,217,289 | 11/1965 | Elliott | 340/15.5 CC |
| 3,376,950 | 4/1968 | Grine | 181/.5 BE |
| 3,622,965 | 11/1971 | Wu | 340/15.5 AC |

Primary Examiner—Benjamin A. Borchelt
Assistant Examiner—J. V. Doramus

[57] ABSTRACT

A method of transmitting sound from a bore hole and thereafter receiving and analyzing its reflections to define finer geologic structure, particularly faults and ore bodies, at distances up to two hundred-fifty feet from the bore hole. Acoustical energy between 100 and 1,000,000 cycles per second is transmitted in discrete bursts from multiple, spaced points along the bore hole; the reflections from boundaries defining material of differing acoustical impedance are received and coherently analyzed to determine time of transit of the acoustical energy, phase shift if any, and strength of the reflection to define parameters of the reflecting interface. Multiple analysis may be carried out in plural drill holes or at spaced points in one drill hole to uniquely define position of acoustically differing interfaces. Analysis may be simplified and definition made finer by directionalizing the searched area, time-gating the returned signal and coherently analyzing it to determine phase shift. Apparatus is disclosed for carrying out the process.

4 Claims, 10 Drawing Figures

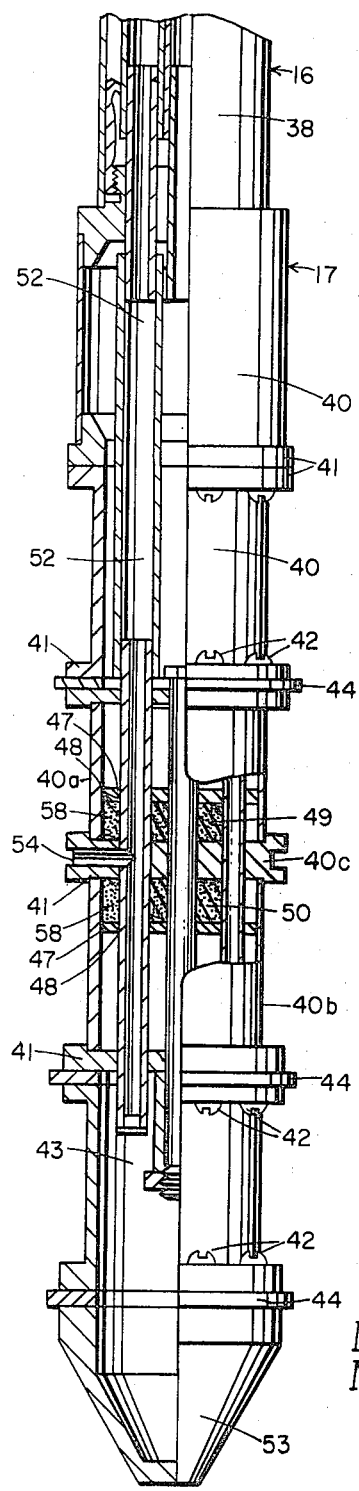
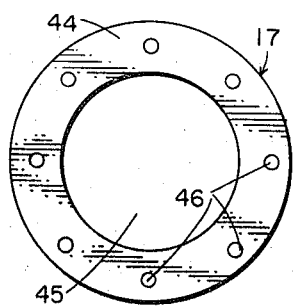
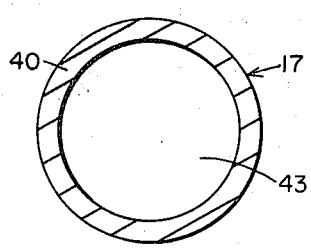
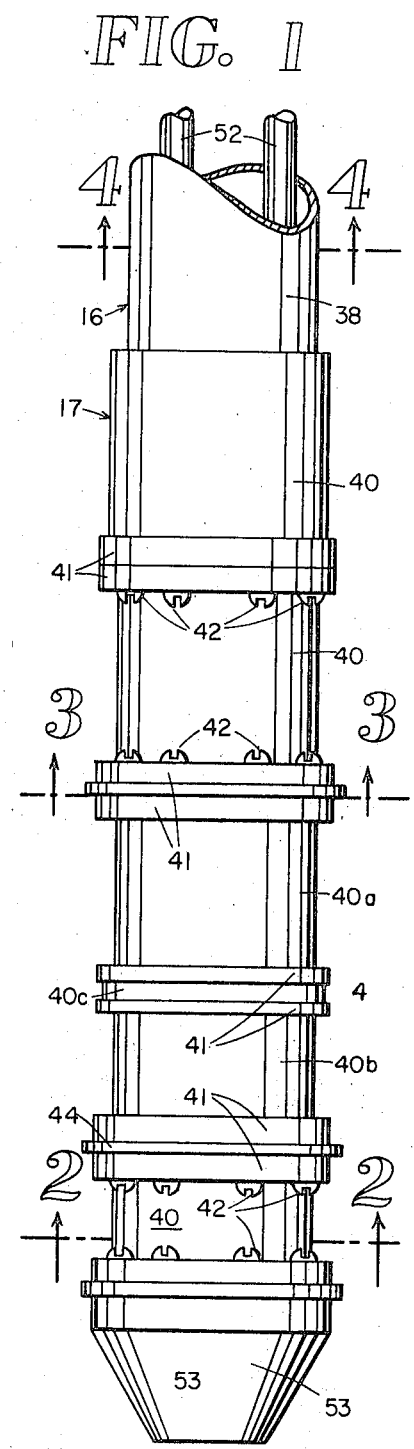
FIG. 5  FIG. 1  FIG. 4  FIG. 3  FIG. 2
Byron B. Brenden, Victor I. Neeley & George F. Garlick INVENTORS
BY *[signature]* ATTORNEY.

Byron B. Brenden,
Victor I. Neeley &
George F. Garlick,

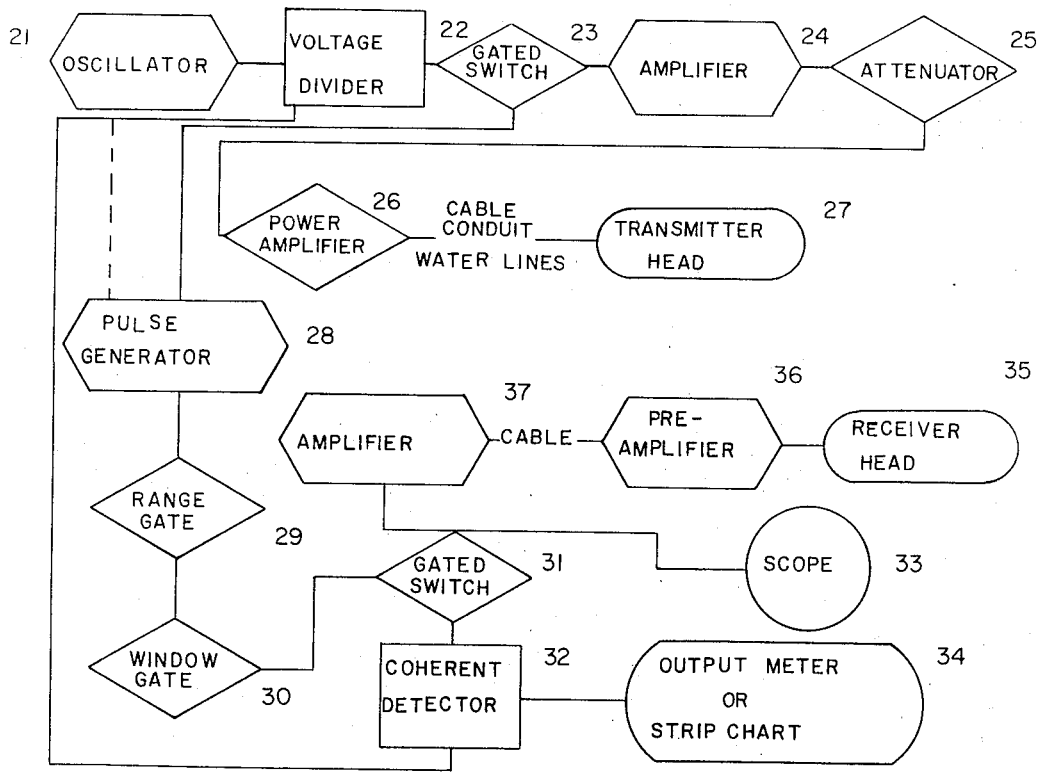
FIG. 8
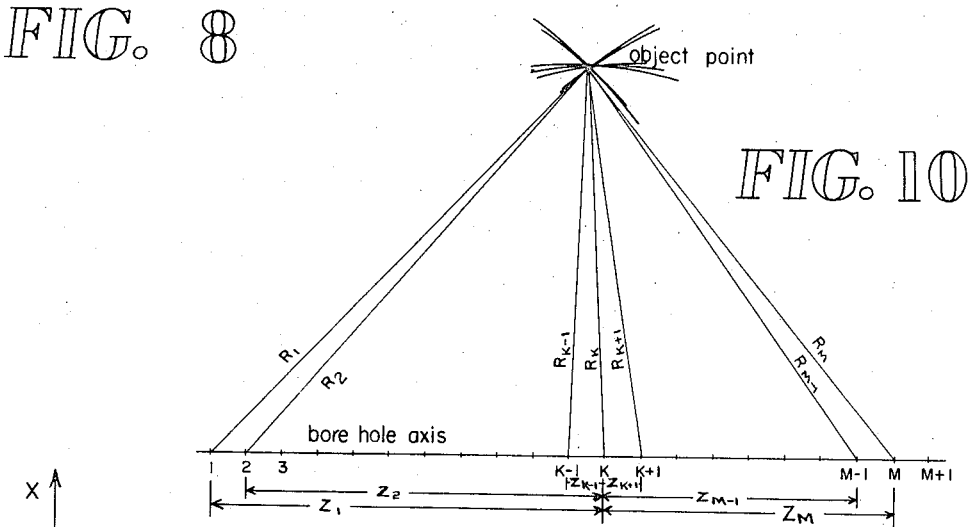
FIG. 10
FIG. 9
Byron B. Brenden, Victor
I. Neeley, &
George F. Garlick, INVENTORS
BY
ATTORNEY.

SCANNING MID FREQUENCY ACOUSTICAL PROSPECTING METHOD

RELATED APPLICATIONS

This is a continuation Application of a pending parent application of the same title filed Apr. 23, 1970 having Ser. No. 31,306, now abandoned.

BACKGROUND OF THE INVENTION

This invention relates generally to the definition of acoustical anomalies in the earth and more particularly to the use of discrete bursts of acoustical energy ranging in frequency between 100 and 1,000,000 cycles per second to define minor geologic features at distances up to 250 feet by using time-gating and coherent analysis of the reflected acoustical energy.

Sonic energy when passing from a medium of one acoustical impedance to a medium of a differing impedance is partially reflected. This physical property has been used in the field of acoustics to provide a nondestructive method of measuring some parameters of acoustically differing masses at a distance, generally by analyzing the reflected sonic energy. The two most common characteristics analyzed are the elapsed time between signal emission and return, which defines a measure of distance and the amplitude of the reflected signal with reference to that of the original signal, which defines a measure of relative change in acoustical impedance as when sonic energy passes from a medium of one acoustical impedance to a medium of another acoustical impedance, the reflected amplitude increases as the acoustic impedance mismatch increases.

Obviously these characteristics might be used to define geologic structures of appropriate physical parameters at a distance from a bore hole within the earth, or even from a position on the surface of the earth, and a field of art has developed teaching methods of so doing. This field may be conveniently classified for analysis, on the basis of acoustical frequencies used, into a first class having searching frequencies ranging up to 100 cycles per second and known generally as seismology; a second class having search frequencies ranging from 100 to 1,000,000 cycles per second and known generally as mid-acoustics; and a third class using search frequencies ranging above one megacycle and commonly known as ultrasonics. The instant invention is concerned with the field of mid-acoustics.

The seismic field has been extensively exploited to define gross geologic structures, especially in relation to the search for naturally occurring petroleum. In distinguishing this field, it must be remembered that the theoretical limits of definition of any information carrying wave system is not greater than the length of the wave involved and the practical definition in most fields usually does not reach this level. Since seismic waves are of low frequency and consequent great wave length, they are capable of defining only the larger or gross geologic structures. This is generally quite sufficient for petroleum prospecting where the structures dealt with are quite large, but it is not at all sufficient for most metaliferous prospecting where the structures sought to be measured are generally well below the physical dimension of the wave length of the seismic waves. The seismic class is similarly distinguishable in the method of formation of the particular sonic energy employed. The extremely low frequency of seismic disturbances requires generally some sort of violent physical activity such as impaction or explosion. This in many instances is not practical or possible in metaliferous mining, especially in bore holes and other underground locations. The methods of reception and analysis of seismic frequency energy similarly differ, as there is appreciable time lapse between the creation of a signal and its return whereas with higher frequency energy this is not the case and more sophisticated receptor apparatus and methods of analysis must be used.

The ultrasonic field provides fine definition, but it must be remembered that the attenuation of sonic energy varies exponentially with the frequency. In modern day electro-acoustical equipment the ratio of power return to power output must not be less than approximately $10^{-12}$ to be sensible, and with the physical characteristics of rock being what they are, an ultrasonic signal will not define a sensible measure beyond one to two feet from a drill hole. Information within this distance range is not particularly valuable as in general the drill hole will give quite as much information as could be determined acoustically at a distance of one to two feet from it. By reason of this, the ultrasonic methods of determining physical parameters at distant location are not too useful in rock-type solids and are generally quite useless in defining minor geologic structures of the nature commonly desired to be measured in metaliferous mineral prospecting.

Our method of prospecting with mid-acoustics is distinguished from each of the other classes, in view of what has been previously said, by providing a sonic system that defines to approximately a one foot measure of resolution at a range up to theoretically 250 feet, and practically at least 50 feet. The system makes use of the piezoelectric effect of ceramic transducers to both produce and receive acoustical energy, providing a simple electro-acoustical system readily adapted to sensing and analysis. With the system, discrete pulses of acoustical energy are directionally transmitted and any reflected portion coherently analyzed on return to allow time-gating to scan only an area at a particular distance from the transmitter and to allow determination of phase change to determine the nature of the interface of the reflecting boundary. Multiple analysis may be used in one or more cooperating boreholes to uniquely define position of acoustical anomalies. The system is well adapted to define finer geologic features of a measure commonly encountered in metaliferous prospecting and will perform this function at substantial distances from a drill hole to provide information in the area sensed without the cost of additional drill holes or the problems associated with the analysis of their cores.

The sensing probe provided is configured to operate from discrete positions in a drill hole. It provides means for fluid coupling to the adjacent rock walls to prevent excessive attenuation of energy.

The instant invention seeks to define areas of acoustical anomaly in solid material by use of sonic energy having frequencies ranging from 100 to 1,000,000 cycles per second, and especially to define finer geologic structure associated with prospecting the earth for metaliferous deposits from a drill hole.

To accomplish this a sensing probe is provided of such configuration as to be movable through a drill hole. The probe carries transmitting and receiving transducers that are preferably directionally orientated to send and receive signals over a selected segment of azimuth. Means are provided to move the device through the bore hole with known positioning and to acoustically couple it with a fluid seal to the surrounding rock. CControl means communicate at a distance to power the sending transducers and analyze the signals from the receiving transducers.

To operate the system, electrical energy is supplied the sending transducers to cause a short burst of sonic energy of some several wave lengths to be transmitted. This energy passes from the probe through the liquid coupling to the surrounding rock and radiates outwardly through that rock. If the sonic energy arrives at an area of acoustical nonconformity, a portion of the energy is reflected back and this reflected energy is ultimately received by the receiving transducers in the probe. The reflected sonic energy is then transformed into electrical energy by the transducers and transmitted to the distant control for further analysis.

The received energy is coherently analyzed with reference to the transmitted energy to determine transit time, which may be related to distance of the reflecting source from the probe. If desired, the signal may be time-gated, that is the apparatus may receive a reflected signal only at a particular period of time, to eliminate noise factors, provide the scanning of areas only at a particular distance away from the probe and simplify analysis.

The signal is further analyzed to determine its strength and the phase of the reflected wave with reference to that of the transmitted wave had it traveled an equal distance without reflection. The signal strength relates to distance and nature of the reflecting surface and phase shift relates to relative acoustical impedance. If the reflected wave be of the same phase as the transmitted wave would have been in traveling an equal distance without reflection, the reflecting nonconformity is of a greater acoustical impedance, whereas if the reflected wave be 180 degrees out of phase the acoustical impedance of the nonconformity is less than the material on the near side of the boundary.

Analysis is carried out at multiple points along a drill hole and all information correlated to further define the structure surrounding the hole. Similar analysis may be carried out in plural drill holes having overlapping areas of search. Without further sophistication, one drill hole would define position to a cyliinder, two drill holes would define to essentially two points and three drill holes would uniquely define position. The system may be further refined by adding multiple analysis, directional transmission and reception of sonic energy, time-gating and coherent analysis to allow unique positional determination of acoustical anomalies from one drill hole. Analysis of information in the refined system becomes complex and may be quite conveniently carried out by computer.

BRIEF DESCRIPTION OF THE DRAWINGS

In the accompanying drawings, wherein like numbers of reference refer to similar parts throughout:

FIG. 1 is an elongate surface view of the probe of our invention showing its surface configuration in detail.

FIGS. 2 through 4 inclusive are horizontal cross sectional views of the probe of FIG. 1 taken on the particular line having numbers corresponding to the particular cross sectional view, all in the direction indicated by the arrows on the section lines.

FIG. 5 is a partially cut-away view of a probe of our invention showing its internal parts, their configuration, and relationship.

FIG. 8 is a block diagram of the control mechanism of our invention.

FIG. 9 is a diagram showing the geometry of analysis of the position of a reflecting point relative the searching bore hole.

FIG. 10 is a diagram showing the principle of multiple point analysis of reflected signals.

DETAILED DESCRIPTION OF A PREFERRED EMBODIMENT

Figure 6:
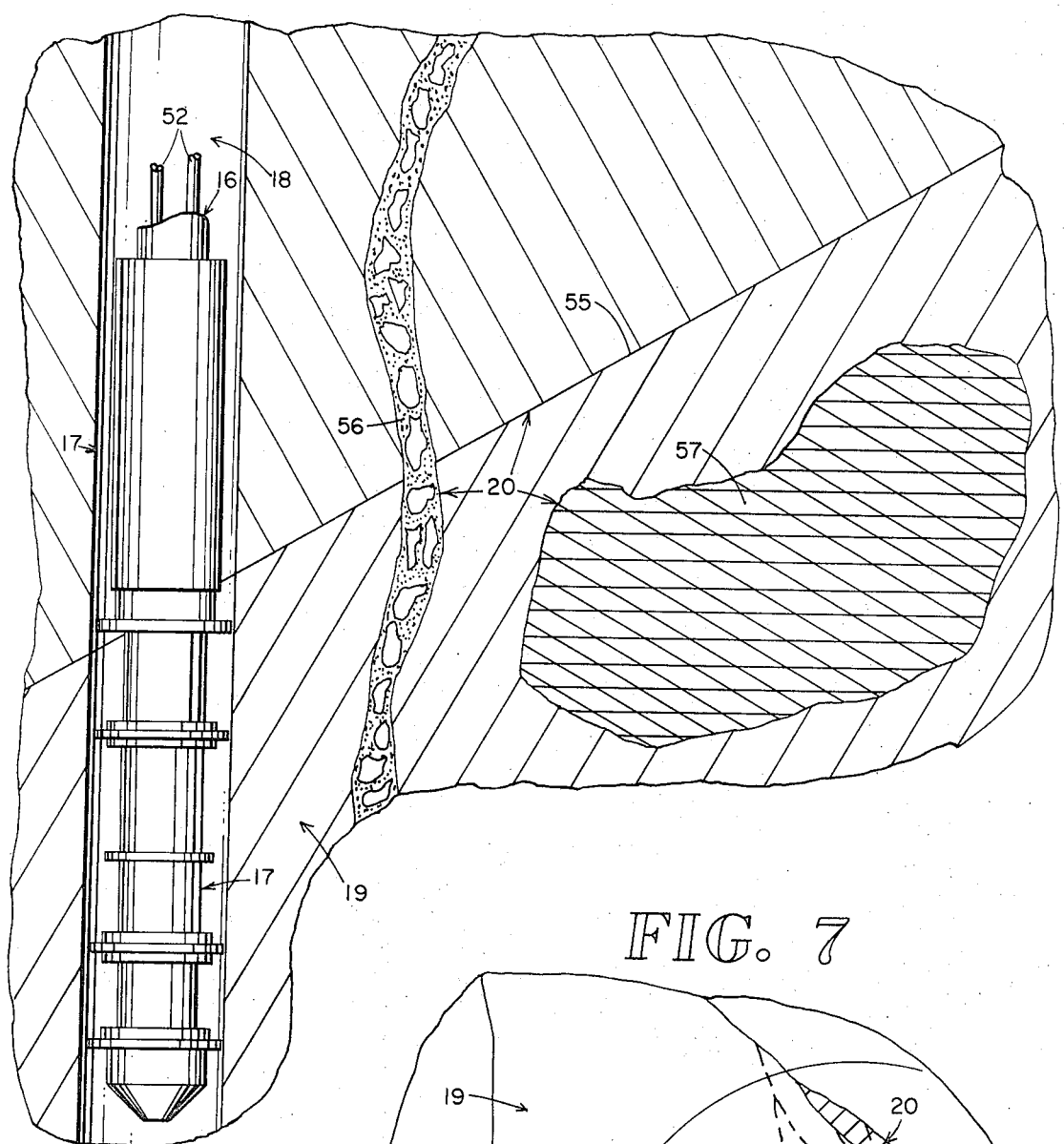
FIG. 6 is an idealized cross sectional view of the probe of our invention in a drill hole in the earth adjacent minor geologic structure to show the operation of our process.

Referring now to the drawings in more detail it will be seen that our invention generally comprises control mechanism 15 communicating through push rod structure 16 to probe 17 that may be moved through drill hole 18 in earth 19 to detect acoustical anomalies 20.

Control mechanism 15 is not directly a part of our invention as its various elements and their functional relationship are known. It is therefore shown symbolically in the block diagram of FIG. 8. Here oscillator 21 presents its output to voltage divider 22 and thence through gated switch 23 to amplifier 24 and attenuator 25 to power amplifier 26 and thence through the push rod structure to transmitter head 27 to complete the transmission circuit. The receiving circuit provides pulse generator 28 activated by oscillator 21 and controlled by gated switch 23 to provide its signal through range gate 29 and window gate 30 to gated switch 31; this gated switch is similarly provided with the signal from voltage divider 22 through coherent detector unit 32.

Oscilloscope 33 communicates with gated switch 31 and output meter 34 communicates with coherent detector 32. The input signal is received by receiving head 35, amplified by pre-amplifier 36 and transmitted through push rod structure 16 to amplifier 37 from whence it is fed into the detecting circuit previously described through gated switch 31, with the signal being visually annunciated on scope 33 and measured by output meter 34. These various components are known in the electrical art for purposes similar to those here served, and might be assembled by any reasonably skilled mechanic.

Figure 7:
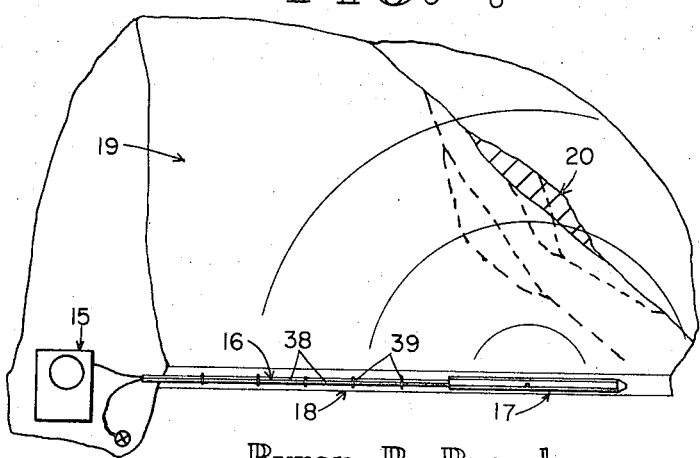
FIG. 7 is an idealized sectional view of our probe in a drill hole in the earth illustrating a speculor reflection from an adjacent anomaly.

The push rod structure comprises a plurality of pipes 38 having interlocking joints 39 (FIG. 7) to form a rigid yet readily assembled and disassembled structure with an internal channel adapted to contain the various servicing wires, cable, and piping communicating from the control structure to the probe. The details of the structure of such a push rod are not critical to our invention so long as the rod provides sufficient rigidity to locate the probe in a positionally determinable fashion and provides a structure that may be assembled and disassembled in close quarters oftentimes encountered in drill holes originating in underground workings.

Probe 17 is preferably formed from a plurality of cylindrical body sections 40 (FIGS. 1 and 5) each having opposed end flanges 41 to allow fastening by bolts 42 to the flange of an adjacent element. Each body section defines internal voids 43 to carry the various operative structures encased within the probe and allow passage of wiring and piping. Interspersed between spaced groups of body sections are at least two annular spacers 44 having internal voids 45 (FIG. 3) and appropriately placed bolt holes 46 to allow their incorporation within the probe structure. These spacers maintain the probe in substantial concentricity within the drill hole and provide a somewhat inefficient seal to maintain liquid between the probe and drill hole.

Various internal fillers or supports 47 may be provided either as separate structures or as part of body sections 40 to properly align, maintain and support the various piping and wiring within the probe with aid of appropriately dimensioned and positioned holes 48 in which the supported structures are carried. This type of structure of probe with modular design allows an assemblage of various elements to form a probe containing the particular elements desired to a particular application.

Body section 40A carries transmitting transducer 49 and body section 40B carries receiving transducer 50. Each of these transducers 49, 50 is preferably a cylindrically shaped element formed preferably of ceramic transducer material. The transducers may be shielded with an annular segment of some insulating material 58, such as expended styrene, to allow transmission of acoustical energy only over the selected uninsulated segment of the transducer with principal signal strength normally perpendicular to the axis of the transducer and probe 17 to define a limited segment of azimuth. This shielding allows directional sending and receiving of sonic energy to materially simplify analysis and increase definition of our process. Various types and configurations of transducers and shields are suitable for use with our invention; one type found particularly desirable (not shown) provides the probe body element 40, per se, formed from transducer material with shielding about the exposed exterior.

Plural spaced transmitter-receiver units 49, 50 may be established at spaced distances in a single probe it desired, the data received from each being treated separately and analyzed as an independent element. Similarly the functioning of the separate transmitting and receiving transducers may be combined in a single transducer, but operation and analysis is more simple if they be separate. The shielding may also assume many orientations, but a search pattern limited in azimuth is normally most desirable.

Water channels are provided through and along the probe to allow probe motion in watered holes and to allow water coupling of the probe in dry holes. Preferably one water course communicates through the probe by tubes 54 from an orifice in the forward part of the probe to one in the rearward part to allow passage of the probe in a watered hole. A second water channel communicates from the control mechanism by duct 52 to probe body portion 40C to there exit through the surface of the body to allow fluid to be injected between the probe and drill hole walls, to create a fluid coupling between the elements in a dry hole.

Preferably the various elements of the probe are formed of brass because of its desirable physical characteristics in the wet environment of normal operation. Similarly the push rod structure preferably is formed of aluminum because of its desirable physical characteristics, especially its light weight. Normally the liquid coupling the probe and drill hole wall would be water, though obviously it could be other fluids.

The method or process of our invention may be understood particularly with reference to the drawings of FIG. 6, et seq., where there is seen a typical drill hole 18 in earth 19 with adjacent acoustical anomalies, in this instance comprising slip fault 55, sheared zone 56, and ore body 57.

To use this process, apparatus is provided according to the foregoing specification and operated to (1) position the probe in the area to be searched, (2) transmit acoustical energy from the probe into the surrounding earth, (3) receive the energy as modified by acoustical anomalies within the searched area of the surrounding matter and (4) analyze the received signals to determine certain parameters of the modifying anomalies, thusly:

1. Positioning of Probe

The area to be searched generally will be that about a drill hole normally produced by diamond drilling. Typically the diamond drill holes used in metaliferous prospecting are of the so-called "B" size, having a nominal 2 ⅜ inch diameter. The particular probe structure illustrated is adapted for use in a hole of this size, though obviously the same general structure, appropriately configured, could be used in either larger or smaller holes.

To produce much useful information, sampling must be done at a plurality of spaced points. This is accomplished by moving the probe along a drill hole having some length, commonly several hundred feet. Preferably the drill hole will be linear in nature though oftentimes in practice they are of a curvi-linear nature. Analysis may be carried out in either type of hole but with more complexity in the curvi-linear type bore. The area searched by our process will be substantially a cylindrical volume formed by the periphery of a circle, the center of which is moved linearly along the drill hole, and having an outer radius ranging generally between twenty and thirty times the wave length of the acoustical energy used, depending upon the media through which it travels.

The probe is moved through the drill hole and its position discretely determined therein by means of the rigid push rod structure 16, which allows direct mensuration. Oftentimes operations with the probe must be carried out from bore holes originating in underground tunnels, adits, chambers, or the like, where there is limited working area and the push rod sections must therefore be of appropriate length to allow this type of activity. Similarly the areas searched for mineralization are oftentimes several hundred feet distant from the origin of the drill hole and the probe rod structure must therefore be assembled to translate the probe through a drill hole at the appropriate distance. Since the rod is rigid, angular orientation of the probe and physical distance may be determined by direct mensuration. If probe position may not be determined directly (as in a nonlinear drill hole), it may be determined by normal drill hole surveying accomplished by means known in the art.

The probe itself will be substantially concentrically positioned within the drill hole by reason of spacers 44.

These spacers will similarly provide a somewhat inefficient water seal between the probe and bore hole walls. If the drill holes be irregular or if a better water seal be required, additional flexible gaskets, such as of rubber, (not shown) may be added. The water channel about the probe allows water to pass from in front of it to its rearward portion during insertion to prevent pressure building ahead of the probe in a watered hole. If a drill hole be dry, water may be supplied from the surface by means of the second water channel to be dispersed between probe and drill hole wall to provide a fluid coupling. Methods of supplying water in this fashion are well-known in the drilling art.

2. Transmission of Acoustical Energy

Control mechanism 15 provides appropriate bursts of electric energy to activate transmitting transducer 49 for a period including several cycles of the desired acoustical frequency — preferably about ten. The principles of our invention are adapted to operate in frequencies between 100 and 1,000,000 cycles. Transducers responsive in this frequency range that have been found useful in experimentation are of the ferroceramic type configured as cylinders (the particular transducers used were designated as PZT-4 and PZT-5 by the manufacturer, Clevite Corporation USA). These transducers have a resonant mode of oscillation of approximately 25,000 cycles corresponding to the circumference, 46,000 cycles corresponding to the length, and 550,000 to 630,000 cycles corresponding to thickness.

The energy generated by the transducer transmitted by the cylindrical surface is the frequency of principal interest. The energy is dispersed over a controlled segment of the transducer by shielding or insulating the remaining surface to create a searching beam of sonic energy, somewhat conical in shape. This beam may be directed to a particular segment of azimuth to define a limited, discretely defined search area.

Preferably a fluid couple is established between the probe and the surrounding drill hole walls to more readily transmit the acoustical energy across the hole to the walls. If water is not naturally present in the drill hole, fluid may be introduced as previously specified, exteriorly of the hole through the water course carried in the push rod and probe structure.

The acoustical energy then passes outwardly through the fluid couple to the earth surrounding the drill hole and continues its progression outwardly unless it encounters an acoustical anomaly such as the fault or ore body illustrated in FIG. 6. If this occurs and sound passes from a medium having a particular acoustic impedance to the second medium having a differing acoustical impedance, a certain amount of the energy passing to the interface or boundary will be there reflected, the amount and nature of reflectance being determined by the physical parameters of the materials forming the boundary.

3. Receiving the Reflected Acoustical Energy

Receiving transducer 50 is of the same type and configuration as transmitting transducer 49 and is physically located in the same orientation immediately adjacent the transmitting transducer for simpler analysis, though obviously it could be at a spaced distance if desired. This transducer is shielded to receive over substantially the same azimuth sector as the transmitted beam searches, again to simplify analysis, to add greater definition, and eliminate noise. The reflected signal from an acoustical anomaly encountered by the transmitted energy is received by the receiving transducer and by it transformed into a similar, representative electrical impulse to be analyzed, measured, and displayed by control mechanism 15.

The energy of the reflected signal must meet certain minimal conditions of present day equipment to be physically discernable. If electric power $P_T$ (energy per unit of time) is fed to the transmitting transducer, it will emit an acoustic power ($\epsilon P_T$) where ($\epsilon$) is the power conversion coefficient of the transmitter. This acoustic energy is radiated in a spherical pattern and after traveling a distance ($r$), the total power emanating from the surface having radius ($r$) is:

$$\epsilon P_T [\exp. (-2\alpha_\nu\ r)] \quad (1)$$

the bracketed term corresponds to the exponential energy decrease due to absorption and scattering, where ($\alpha_\nu$) is the absorption coefficient per unit length which is dependent upon frequency ($\nu$).

If a reflector is placed at a distance ($r$) from the acoustic source it reflects a fraction of the total power equal to the reflection coefficient ($\gamma$) of the reflector multiplied by the ratio of reflector area ($A_N$) to the surface of a sphere of radius ($r$). The total power reflected is then:

$$\gamma [A_N/4\pi r^2]\ \epsilon P_T \exp. (-2\alpha_\nu\ r) \quad (2)$$

If this reflector is a point reflector or substantially so, the energy will be reflected back in a hemispherical pattern. If an acoustic receiver of area ($A_R$) is located near the transmitter, the power ($P_R$) incident upon the receiver will be the total reflected by the reflector multiplied by the ratio of the area of the receiver to the area of the hemispherical surface modified by the conversion efficiency ($\epsilon$) of the acoustical receiver (assumed to be the same conversion efficiency as that of the transmitter) and the exponential term representing the loss due to absorption and scattering. The equation then becomes:

$$P_R = \gamma\epsilon^2 A_R A_N P_T\ (1/2\pi r^2)\ (1/4\pi r^2)\ \exp.(-2\alpha_\nu\ r)\exp.(-2\alpha_\nu\ r) \quad (3)$$

This equation (3) is an expression of the electrical power received by the acoustic receiver ($P_R$). Combining terms in this last equation the ratio of received power to transmitted power may be expressed as:

$$P_R/P_T = \gamma\epsilon^2 A_R A_N\ (1/8\pi^2 r^4)\ \exp.(-4\alpha_\nu\ r) \quad (4)$$

The reflection coefficient ($\gamma$) may be expressed as:

$$\gamma = [(pv - p'v')/(pv + p'v')]^2 \quad (5)$$

where (p) and (v) are the density and acoustic velocity in one medium and ($p'$) and ($v'$) are the density and acoustic velocity in a second medium. The product ($pv$) is generally known as acoustical impedance. In dealing with ore bodies such as galena in quartzite, tetrahedrite in quartzite or galena in dolomite there is an acoustic impedance which differs by a factor of approximately two from that of the surrounding rock. Inserting this value into the last equation this yields $\gamma = 0.11$ for these materials. The values of ($\alpha_\nu$) have variously been reported in the literature. In general the ratio of ($\alpha_\nu$) divided by ($\nu$) is a constant for rock structures; that is, ($\alpha_\nu$) varies substantially linearly with frequency. The values from the literature typically for ($\alpha_\nu$) in granite rocks is equal to $\nu \times 10^{-7}$.

The power conversion efficiency ($\epsilon$) of the particular ceramic ferro-electric transducers used is fairly typical and approximately 0.33 for either specified.

Under most operating conditions the ratio of power received to power transmitted, using a high-gain, coherent detection system, can conservatively be as low as $10^{-12}$. Usually the transmitted and received voltages are measured and have a ratio of approximately $10^{-6}$ but since the voltage is proportional to the square root of the power the smaller factor results.

Making these appropriate substitutions of $v = \nu \Lambda$ and $\eta \Lambda = r$ where $\Lambda$ is the acoustical wave length and assuming that the area of the acoustic receiver ($A_R$) and the area of the acoustic reflector ($A_N$) both equal $\Lambda^2$, this yields the general equation:

$$P_R/P_T = 10^{-12} = (0.11)(0.33)^2(\Lambda^2)(\Lambda^2)(1/8\pi^2\eta^4\Lambda^4) \exp(-4\nu n \times 10^{-7}) \tag{6}$$

and inserting the typical value of $v = 5.5 \times 10^5$ cm/sec. for granite rock, the equation yields:

$$10^{-12} = (0.0121/8\pi^2 n^4) \exp(-0.22n) \tag{7}$$

solving for $n$: $n \cong 26$ indicating that with point reflectors and granite rock the maximum distance of detection of acoustical anomalies is 26 times the wave length of the acoustic frequency being employed. At a search frequency of 20,000 cycles in granite-type rocks the wave length would be 30 centimeters or approximately one foot, which would give a range of detection for a point-like object of approximately 26 feet. At search frequencies of 2,000 cycles the maximum range would be approximately 260 feet.

The foregoing calculations are based upon the assumption that the reflector reflects energy in a diffuse manner — substantially in a hemispherical pattern. In many instances an ore body will be quite sizable and will reflect a signal specularly rather than diffusely. Under these conditions the equation expressing power ratio resulting from a specular reflection is:

$$P_R/P_T = \gamma \epsilon^2 A_R (1/16\pi r^2) \exp(-4\alpha_\nu r) \tag{8}$$

and introducing the same substitutions as before the equation reduces to:

$$P_R/P_T = 10^{-12} = (0.0121/16\pi n^2) \exp(-0.22n) \tag{9}$$

solving for: $n \cong 50$

Thus, the effect of a specular reflection is to approximately double the effective range of the system.

4. Analysis of Reflected Energy

The analysis of data from the system may be best described by considering the various signals associated with operation of the system. Referring to FIG. 9, the drill hole axis is taken as the $z$ axis of the coordinate system and an object is located at position $r$ where the magnitude of $r$ is given by $(x^2 + z^2)^{1/2}$. Because of the cylindrical symmetry of the system the third coordinate may be neglected and object points plotted as function of $z$ and $x$.

It is assumed that the position of transmitter and receiver are identical at origin position (0) along the bore hole. The acoustical signal sent out is reflected by object $(x,y)$ and detected at the receiver. If the pulse of acoustic energy is sufficiently long that it can be considered quasicontinuous, the amplitude of the signal at the receiver is expressed as:

$$u = A \cos 2\pi (\nu t + 2r/\Lambda + \phi/2\pi) \tag{10}$$

The signal is then introduced into one port of a doubly balanced mixer, where the second port has the reference signal present. The reference signal would be:

$$u' = A' \cos 2\pi (\nu t + \phi'/2\pi) \tag{11}$$

The third port of the mixer extracts a signal which represents the difference between the receiver signal ($u$) and reference signal ($u'$). The difference signal has an amplitude approximately equal to the smaller of the amplitudes of the reference or received signal and a frequency equal to the difference between the frequencies of the two signals. If the frequencies of the two signals are the same, as they are in all cases of interest, the output of the third port of the mixer is a DC signal, the magnitude (B) of which is expressed as:

$$B = A \cos 2\pi (2r/\Lambda + (\phi - \phi')/2\pi) \tag{12}$$

This signal is present during the time the pulse of equation (10) is received and is zero at all other times.

Since the amplitude of the received signal is always smaller than the amplitude of the reference signal, the amplitude of the output signal from the third port of the double balanced mixer is equal to the amplitude (A) of the received signal. The phase factors $\phi$ and $\phi'$ designate the phase of the received and reference signals respectively, and the difference represents any phase shift introduced by the reflecting object. This phase shift will be later discussed, but assuming it to be zero, the last equation becomes:

$$B = A \cos 2\pi (2\sqrt{x^2 + z^2}/\Lambda) \tag{13}$$

The amplitude of this signal will then be at a positive maxima wherever:

$$n = 2(\sqrt{x^2 + z^2})/\Lambda \tag{14}$$

where ($n$) is a positive integer.

Considering a single point for illustration, with range gating for a known velocity of sound in particular media, the distance of the object ($r$) from the source and receiver is known. Since the source is considered as a point source, the radiation is spherical and a single measurement of ($r$) will not determine the precise values of ($x$) and ($z$), as the object may be at any location on a sphere. As shown in FIG. 11, however, the values of ($x$) and ($z$) may be determined simply by observing the symmetry of the maxima of the signal along the axis of the minimum value of ($r$). Again as illustrated in FIG. 10, the location of the object point is at the point of intersection of plural spheres formed by radii ($r_x$) where ($x$) varies from ($l$) to ($m$). The intersection of these spheres, it is to be noted, determines only the radial distance from the bore hole.

Under more complicated conditions there will be more than one reflecting object along the bore hole axis and there may be objects at distances greater than that traversed by the probe in the bore hole. Assuming that there are N reflecting objects, each position may be defined as ($r_i$) and ($i$) varies from (1) to (N). If so, the expression for the signal at the receiver is given by:

$$y = \sum_{i=1}^{N} A_i \cos 2\pi(\nu t + 2r_i/\Lambda + \phi_i/2\pi) \quad (15)$$

If the reference signal again be assumed to be that of equation (12), when it be combined with the received signal of equation (15) in the balanced mixer, the output will be expressed as:

$$B = \sum_{i=1}^{N} A_i \cos 2\pi(2r_i/\Lambda) \quad (16)$$

In this equation, assuming no phase shift, ($\beta_i - \phi'$) goes to zero and disappears. This equation (16) then becomes the general expression of the output voltage from the balanced mixer where the reference signal is mixed with the signals reflected from (N) points.

The output of the mixer given by the last equation will generally undergo a complex variation in amplitude as the detector is moved along the $z$ axis, unless an anomaly be parallel to that axis. The pattern of variation in signal strength represents a transform of the object configuration and thusly the object may be described as to shape by simply performing the appropriate transform on the signal pattern along the $z$ axis. In this regard it is to be noted that for adequate description of an object containing (N) points, a number of sampling points (M) must exceed the number of object points (N), and the spacing of sampling points along the z axis should be equal to one half of the wave length of the signal, or the minimum resolution available from the system, whichever be less.

A more direct method of analysis may be applied using range gating. With this technique, only signals are accepted which are reflected at a given distance ($r_i$) from the detector. Thusly each of the values for the amplitude ($A_i$) and range ($r_i$) given in equation 16 may be independently determined. The location and configuration of the object may then be determined by an extension of the treatment mentioned above.

In the forgoing illustration the location of the object point was determined by the intersection of spheres from (M) detection points. For the extension there would be (N) spheres corresponding to (N) object points at each of (M) positions of measurement; thusly, the object size and location would be determined by recording the position of intersection of N × M spheres. Because of the large amount of data involved, it is best calculated and displayed by use of a computer. An appropriate computer program has been created such as will accumulate the number and location of all of the intersections of N × M spheres. In making this summation the intersection may be given a weighted value depending upon signal strengths from the spheres being considered and, if so, the end result will b a two-dimensional plot, which shows the location of the object with respect to the radial distance from the bore hole and the distance along the hole.

In general other information will be required to determine the angular orientation (azimuth angle in a vertical hole) of the object point about the bore hole.

This additional data may be obtained from existing geologic data, either previously known or obtained from the drill hole; by use of directionally oriented search beams received only from a limited searched sector; or by use of plural drill holes having intersecting search areas. Needless to say in the latter case the data is voluminous and computers again are nearly necessary to analyze it.

With the ordinary range gating techniques there are inherent limitations of resolution and sensitivity. The resolution is limited by the length of physical pulse, but at relative high frequencies and short ranges this is usually not a critical limitation. At greater distances, however, to maintain fine resolution, other techniques must be employed such as coherent processing.

To do this a quasi-continuous pulse of at least ten cycles is transmitted so that the signal is off sufficient length to establish the center frequency to allow coherent processing. Upon receiving the reflected signal it is compared in a balanced mixer with a reference signal of equal frequency and constant phase relation. This provides for acceptance of only those signals of the same frequency as are transmitted and gives information as to the phase relation of the received signals relative to the transmitted signal. The phase information may be processed to resolve the location of two object points spaced on the order of one wavelength apart, the theoretical limit of the system.

Coherent processing also allows the elimination of noise and the increase of sensitivity of the system. The processing automatically eliminates noise of frequencies other than the transmitted frequency and summing the output signal over many pulses will average out any random noise at the frequency of the transmitted signal.

Detection of the phase shift by coherent processing gives further information about the reflecting interfaces. Remembering that when sound passes a boundary between mediums of differing acoustical impedance the phase remains the same if the sound passes from a medium of lower to one of higher impedance and shifts 180 degrees when it passes from a medium of higher to one of lower impedance, a fault may generally be distinguished from an ore body. Thusly when acoustical energy is reflected from the interface between country rock and an ore body, the sound will generally pass from matter of lower acoustical impedance to matter of higher impedance and the reflection will remain in phase with the transmitted signal; but in the case of energy passing from country rock to a fault — generally having clay, voids, water or breccia — the acoustical impedance will decrease, thusly causing a 180° phase shift in the reflected signal from that of the transmitted signal. Oftentimes many finer geologic features may be distinguished on this basis.

In experimentation with the system described in existing mines, it has been found that the method using range gating and coherent processing has a resolution very nearly of one wavelength of the signal used with a sensitivity of power received to power transmitted of approximately $10^{-12}$ when search frequencies are at approximately 20 KHz.

The foregoing description of this invention is necessarily of a detailed nature so that a specific embodiment of it might be set forth as required, but it is to be remembered that various modifications of detail, rearrangement and multiplication of elements may be resorted to without departing from its spirit, essence or scope.

What I claim is:

1. A prospecting method for creating a dimensional transform of the geological structures in a search volume of solid earth materials, comprising the steps of:
   a. transmitting a pulse of acoustical energy having a frequency between 100 and 1,000,000 cycles per second into the search volume from a reference location to generate a number of reflected return pulses of acoustical energy when the transmitted pulse encounters interfaces between earth materials having different acoustical impedances, in which the number of reflected return pulses relates to the number of interfaces in the search volume;
   b. receiving the reflected return pulses of acoustical energy at the reference location;
   c. comparing the elapsed time between the transmission of the pulse from the reference location and the reception of the return reflected pulses at the reference location to determine distances of the interfaces from the reference location;
   d. successively repeating the above steps at each of a plurality of spaced reference locations in which each reference location is spaced from adjacent locations a distance equal to or less than one half of the wavelength of the transmitted pulse;
   e. determining the number of return pulses received at each reference location; an
   f. continuing the repetition of the above steps until the number of reference locations at least exceeds the number of reflected pulses received at any one location.

2. The prospecting method according to claim 1 wherein only th reflected return pulses generated from a particular zone, a selected distance from the reference location, are received.

3. The prospecting method according to claim 1 wherein the transmitted pulse has a width of at least 10 cycles and further comprising the step of coherently processing the received pulses to eliminate those received pulses that are not of the same frequency as the transmitted pulse and to analyze the phase relation of the reflected received pulses with the transmitted pulse.

4. The prospecting method according to claim 1 wherein the reference locations are axially spaced in a drill hole made in the solid earth material adjacent the volume to be searched and further comprising the step of directing the transmitted pulses in a desired direction from the reference locations into a limited segment of the search volume.

* * * * *

UNITED STATES PATENT OFFICE
CERTIFICATE OF CORRECTION

Patent No. 3,832,677            Dated August 27, 1974

Inventor(s) Byron B. Brenden, Victor I. Neeley, George F. Garlick

It is certified that error appears in the above-identified patent and that said Letters Patent are hereby corrected as shown below:

1. Column 8, line 16

Formula (1)  $\epsilon P_t [\exp(-2\nu r)]$ should be:  $\underline{\epsilon P_t [\exp(-2\alpha_\nu r)]}$ 2. Column 9, line 21

The expression $n\Lambda = r$

Should be:  $\underline{n\Lambda = r}$

3. Column 9, line 26

Formula (6)

$P_r/P_t = 10^{-12} = (0.11)(0.33)^2 (\Lambda^2) (\Lambda^2) (1/8n\Lambda^4) \exp(-4\nu n \times 10^{-7})$ Should be:

$\underline{P_r/P_t = 10^{-12} = (0.11)(0.33)^2 (\Lambda^2) (\Lambda^2) (1/8\pi n\Lambda^4) \exp(-4\nu n \times 10^{-7})}$ Signed and sealed this 31st day of December 1974.

(SEAL)
Attest:

McCOY M. GIBSON JR.              C. MARSHALL DANN
Attesting Officer                Commissioner of Patents